(12) United States Patent
Mori et al.

(10) Patent No.: US 10,704,894 B2
(45) Date of Patent: Jul. 7, 2020

(54) LASER SENSOR AND MANUFACTURING METHOD FOR EXTERIOR COMPONENT

(71) Applicant: Konica Minolta, Inc., Chiyoda-ku, Tokyo (JP)

(72) Inventors: Hajime Mori, Fuchu (JP); Tomokazu Taguchi, Osaka (JP); Norihiro Nagai, Toyohashi (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 16/094,361

(22) PCT Filed: Apr. 20, 2016

(86) PCT No.: PCT/JP2016/062574
§ 371 (c)(1),
(2) Date: Oct. 17, 2018

(87) PCT Pub. No.: WO2017/183145
PCT Pub. Date: Oct. 26, 2017

(65) Prior Publication Data
US 2019/0137259 A1    May 9, 2019

(51) Int. Cl.
*G01B 11/26* (2006.01)
*G01B 11/02* (2006.01)
(Continued)

(52) U.S. Cl.
CPC .......... *G01B 11/026* (2013.01); *G01B 11/26* (2013.01); *G01S 7/4811* (2013.01); *G01S 7/4813* (2013.01); *G01S 7/4817* (2013.01); *G01S 17/42* (2013.01)

(58) Field of Classification Search
CPC ..... G01B 11/026; G01S 7/4811; G01S 17/00; G01S 17/42
See application file for complete search history.

(56) References Cited

U.S. PATENT DOCUMENTS

| | | | | |
|---|---|---|---|---|
| 5,706,140 A | * | 1/1998 | Nishino | ................ G01S 7/4811 359/793 |
| 7,545,485 B2 | * | 6/2009 | Okada | ................... G01S 7/4812 356/4.01 |

(Continued)

FOREIGN PATENT DOCUMENTS

| | | |
|---|---|---|
| JP | 2005055226 A | 3/2005 |
| JP | 2006349449 A | 12/2006 |

(Continued)

OTHER PUBLICATIONS

International Search Report corresponding to Application No. PCT/JP2016/062574; dated Jul. 19, 2016.

(Continued)

*Primary Examiner* — Maurice C Smith
(74) *Attorney, Agent, or Firm* — Cantor Colburn LLP

(57) ABSTRACT

Provided is a laser sensor including an optical window with high accuracy and having excellent dustproof and waterproof properties. The laser sensor includes: a light projector; a light receiver to detect reflection light from a detection object to which laser light is emitted from the light projector; and an exterior component covering the light projector and the light receiver, in which the exterior component includes an optical window that transmits the laser light and the reflection light, and a holder that surrounds an outer periphery of the optical window, the optical window and the holder are formed as an integrally-molded product made of a resin having transmittivity in a wavelength band of the laser light, the optical window includes a pair of curved optical surfaces facing each other, and the holder includes: a gate part at a position relatively distant from the optical window; and a light shielding part that is at least adjacent to the optical window and shields the laser light L1 and ambient light.

17 Claims, 11 Drawing Sheets

(51) Int. Cl.
   *G01S 7/481*   (2006.01)
   *G01S 17/42*   (2006.01)

(56)            References Cited

U.S. PATENT DOCUMENTS 8,681,319 B2 *   3/2014   Tanaka .................... G01S 17/42
                                                        356/3.01
   9,316,724 B2 *   4/2016   Gehring .................. G01S 17/42
   10,061,021 B2 *  8/2018   Faetani ................... G01S 7/487
   2005/0024625 A1  2/2005   Mori et al.
   2005/0168720 A1  8/2005   Yamashita et al.
   2006/0188595 A1  8/2006   Furukawa et al.
   2016/0216138 A1* 7/2016   Rudmann ............... G02B 5/223

FOREIGN PATENT DOCUMENTS

JP        2008282021 A    11/2008
   JP        2011141261 A     7/2011
   JP        2015081769 A     4/2015
   JP        2015215282 A    12/2015

OTHER PUBLICATIONS

Written Opinion of the International Searching Authority corresponding to Application No. PCT/JP2016/062574; dated Jul. 19, 2016.
Extended European Search Report corresponding to Application No. 16899417.6-1022 PCT/JP2016062574; dated Jan. 3, 2019.
JPO Notice of Reasons for Refusal for corresponding Patent Application No. JP2018-512712, dated Apr. 1, 2020.

* cited by examiner

LASER SENSOR AND MANUFACTURING METHOD FOR EXTERIOR COMPONENT

CROSS REFERENCE TO RELATED APPLICATIONS

This is the U.S. national stage of International application No. PCT/JP2016/062574, filed on Apr. 20, 2016, the disclosure of which is incorporated herein by reference.

TECHNICAL FIELD

The present invention relates to a laser sensor that detects an object from laser light reflected at the object and a manufacturing method for an exterior component for the laser sensor.

BACKGROUND ART

There is a known sensor that identifies a size and a speed of an object, a distance of the object from a sensor, and the like by utilizing reflection light returned from a detection object by irradiating the object with the laser light (see Patent Literatures 1 and 2). The sensor is covered with an exterior component for protection, and the exterior component is provided with an optical window that transmits light in a wavelength band of laser to be emitted in order to: make projected light beams be emitted to the object located outside from a laser light source located inside; and make the reflection light from the detection object enter a light receiver located inside. In Patent Literatures 1 and 2, an optical window main body and components other than the optical window are separately manufactured, and the exterior component for the sensor is obtained by joining these components.

When the exterior component is manufactured by the above-described method, there are problems in accuracy of the optical window, dustproof and waterproof properties of the exterior component, weight reduction, and miniaturization. First, as for the accuracy of the optical window, in a case where the optical window has a curved surface, there is a problem that a manufacturing error such as a shape error at the time of bending processing and a thickness error at the time of injection molding are likely to occur. Additionally, when the optical window is joined to a component to which the optical window is to be attached by using an adhesive or the like, there is a problem that the surface shape of the optical window is likely to be distorted by stress. Thus, when accuracy of the optical window is not good, a light amount is reduced because the laser cannot be projected and received at an aimed place, and there is a possibility that detection accuracy is seriously deteriorated, especially on a long-distance side. Additionally, as for the dustproof and waterproof properties, in a case where the optical window is made of a resin and a component to which the optical window is to be attached is made of a metal, there is a problem that a joined part is easily peeled off due to a difference in linear expansion, and dust and moisture intrude in the inside at the time of environment change such as change of a temperature or the like. Furthermore, as for the weight reduction and miniaturization, restrictions are imposed on matters such as components to be joined and a joining range in view of securing strength and the like, and there may be a problem that application to a compact moving body such as a drone becomes difficult.

CITATION LIST

Patent Literature

Patent Literature 1: JP 2015-215282 A
Patent Literature 2: JP 2011-141261 A

SUMMARY OF INVENTION

The present invention is made in view of the above-described problems in the background art and is directed to providing a laser sensor including an optical window with high accuracy and having excellent dustproof and waterproof properties.

Additionally, the present invention is also directed to providing a manufacturing method for an exterior component for a laser sensor, in which the exterior component constitutes the laser sensor and covers the outside of the sensor.

To achieve the above-described object, a laser sensor according to the present invention is a laser sensor including: a light projector, a light receiver to detect reflection light from a detection object to which laser light is emitted from the light projector, and an exterior component covering the light projector and the light receiver, in which the exterior component includes an optical window that transmits the laser light and the reflection light, and a holder that surrounds an outer periphery of the optical window, the optical window and the holder are formed as an integrally-molded product made of a resin having transmittivity in a wavelength band of the laser light, the optical window includes a pair of curved optical surfaces facing each other, and the holder includes: a gate part at a position relatively distant from the optical window; and a light shielding part that is located at least adjacent to the optical window and shields the laser light and ambient light. Here, the ambient light represents light such as sunlight, light from a fluorescent lamp, or the like unnecessary in detection at the light receiver.

In the above-described laser sensor, since the optical window and the holder of the exterior component are formed as the integrally-molded product made of the resin, excellent dustproof and waterproof properties can be achieved because there is no need to join the optical window to the holder in a separate step. Furthermore, since the optical window and the holder are integrated, the exterior component of the laser sensor has relatively high rigidity, shape variation due to shrinkage and deformation at the time of molding is reduced, and the optical window with high accuracy is achieved. Moreover, since the optical window and the holder are integrated, structural or shape-related restrictions are more reduced than in the case of joining the optical window in a separate step, and weight reduction and miniaturization of the laser sensor can be achieved.

Additionally, a manufacturing method for an exterior component according to the present invention is a manufacturing method for an exterior component for a laser sensor, and the method includes: a molding step of integrally molding the exterior component from a resin having transmittivity in a wavelength band of laser light by using a metal mold that includes a window transfer to form an optical window and a holding transfer to form a holder surrounding an outer periphery of the optical window out of an exterior component, the optical window transmitting at least the laser light and reflection light of the laser sensor; and a light shielding treatment step of forming, in the holder, a light shielding part that shields the laser light and ambient light, in which the window transfer includes a curved transfer surface, and the holding transfer includes a gate at a position relatively distant from the window transfer.

In the manufacturing method for an exterior component, since the optical window and the holder of the exterior component are integrally molded by using the resin, excellent dustproof and waterproof properties can be achieved because there is no need to join the optical window to the holder in a separate step. Additionally, since the optical window and the holder are integrated, the exterior component has relatively high rigidity, shape variation due to shrinkage and deformation at the time of molding is reduced, and the optical window with high accuracy is achieved. Furthermore, since the optical window and the holder are integrated, structural or shape-related restrictions are more reduced than in the case of joining the optical window in a separate step, and weight reduction and miniaturization of the exterior component can be achieved. Moreover, since the gate is provided at the position relatively distant from the window transfer, it is possible to suppress deformation of a surface shape of the optical window due to distortion of the gate part at the time of molding.

BRIEF DESCRIPTION OF DRAWINGS

FIG. 11 is a diagram to describe a modified example of the main exterior part illustrated in FIG. 2C and the like.

DESCRIPTION OF EMBODIMENTS

First Embodiment

A laser sensor and a manufacturing method for an exterior component therefor according to an embodiment of the present invention will be described below with reference to the drawings.

[Laser Sensor]

Figure 1:
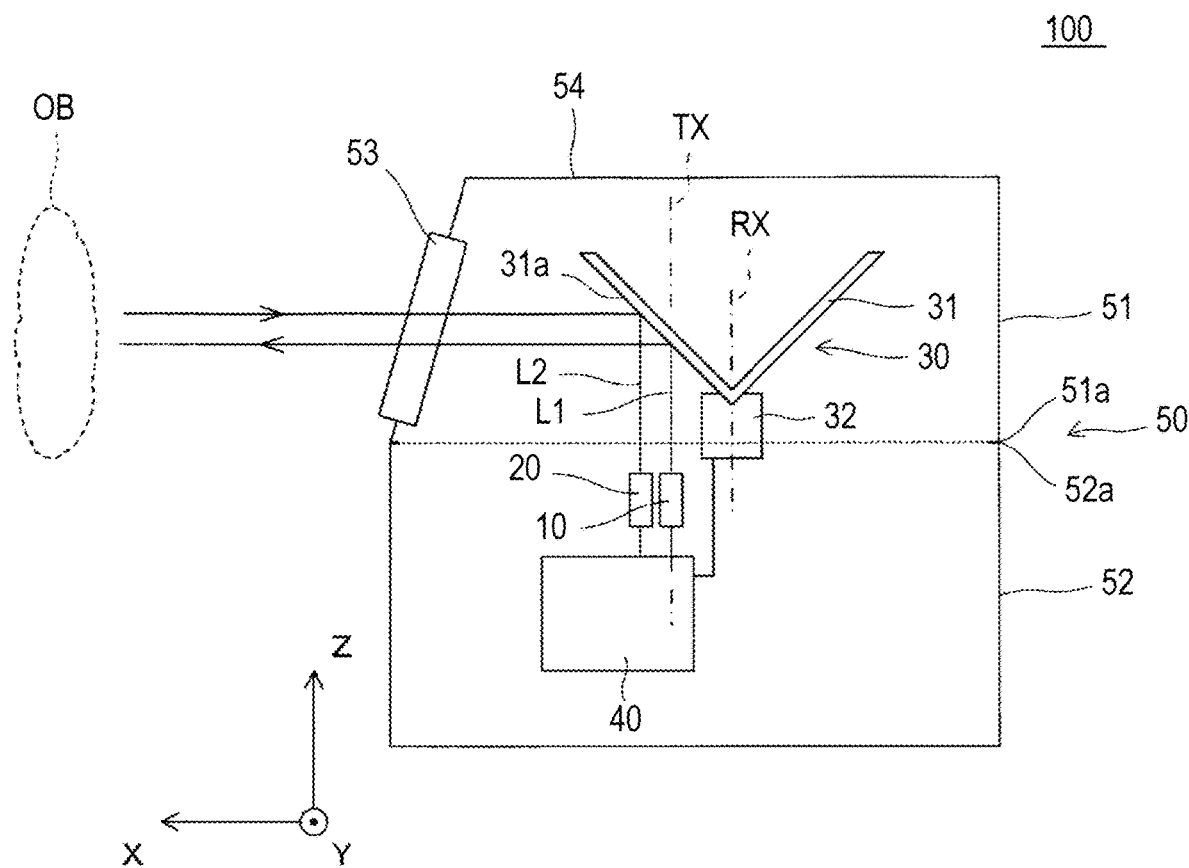
FIG. 1 is a schematic view to describe a structure of a laser sensor according to a first embodiment of the present invention.

FIG. 1 illustrates a schematic structure of a laser sensor 100 according to a first embodiment of the present invention. The laser sensor 100 is, for example, an object detection device used for indoor/outdoor monitoring or used for an on-vehicle application, and detects presence of a detection object and a distance to the detection object. The laser sensor 100 includes a light projector 10, a light receiver 20, a rotating reflector 30, a controller 40, and an exterior component 50. In the present embodiment, the light projector 10, light receiver 20, rotating reflector 30, and controller 40 are provided inside an exterior component 50 as built-in components of the laser sensor 100.

In the laser sensor 100, the light projector 10 projects laser light L1 to a reflection mirror 31 of the rotating reflector 30 described later. Although not illustrated, the light projector 10 includes a laser light source and a coupling lens. The former laser light source is operated under the control of the controller 40, thereby emitting pulse light as the laser light L1 at predetermined timing. The latter coupling lens is arranged on an optical path between the laser light source and the rotating reflector 30, and changes the laser light L1 into beams of parallel light or beams of divergent light slightly diverging. The laser light L1 is reflected at the reflection mirror 31 and emitted to a detection object OB side, that is, the outside of the exterior component 50 via an optical window 53 of the exterior component 50 described later.

The light receiver 20 receives, from the detection object OB: reflection light L2 having entered via the optical window 53 of the exterior component 50; and reflected at the reflection mirror 31 of the rotating reflector 30. More specifically, when there is the detection object OB such as an object in a detection region, the laser light L1 emitted from the laser sensor 100 is reflected at the detection object OB, and a part of the light reflected at the detection object OB is returned to the light receiver 20 of the laser sensor 100 as the reflection light L2. The light receiver 20 includes a condensing lens and a sensor although not illustrated. The former condensing lens is arranged on the optical path between the rotating reflector 30 and the sensor, and condenses the reflection light L2. The latter sensor is a one-dimensional or two-dimensional light detection device that is operated at a high speed, receives the reflection light L2 via the condensing lens, and outputs, to the controller 40, a signal corresponding to a received light amount or a light received position.

The rotating reflector 30 includes the reflection mirror 31 and a rotation driver 32. The reflection mirror 31 is a one-time reflection type polygon mirror and includes a first reflector 31a to bend an optical path. The first reflector 31a has a pyramidal shape having a central axis in a Z axis direction. The reflection mirror 31 is rotated around a rotation axis RX extending in parallel to the Z axis, and scans an XY plane with the laser light L1 and the reflection light L2. In the reflection mirror 31, a mirror surface of the first reflector 31a is inclined with respect to the Z axis and reflects the laser light L1 incident from a −Z direction, namely, a lower direction in the drawing toward a substantially orthogonal direction thereto, and guides the same to the detection object OB side, namely, a left direction in the drawing. A part of the reflection light L2 reflected at the detection object OB travels along a path opposite to the path of the laser light L1 and is detected by the light receiver 20. In other words, the reflection mirror 31 reflects again the reflection light L2 that has been reflected at the detection object OB, namely, returned light at the mirror surface of the first reflector 31a, and guides the same to the light receiver 20 side. When the reflection mirror 31 is rotated, a travel direction of the laser light L1 is changed inside the plane orthogonal to the Z axis direction (the plane is the XY surface, and in a case where the Z axis is the vertical direction the plane corresponds to a horizontal surface). In other words, with rotation of the reflection mirror 31, scanning with the laser light L1 is performed along a Y direction. An angular region scanned with the laser light L1 is to be a detection region. An inclination angle with respect to a +X axis direction that is the travel direction of the laser light L1 for projection is a projection angle, and an angle formed between the travel direction of the laser light L1 at a scanning start point and the travel direction of the laser light L1 at a scanning finish point is to be an irradiation angle. In the present embodiment, the irradiation angle of the laser light L1 is 60° or more with respect to a direction perpendicular to a reference axis TX of the exterior component 50, namely, a direction horizontal to the XY plane. This irradiation angle corresponds to a detection region or a measurement range of the laser sensor 100. Specifically, the detection region expands in the horizontal direction along the XY plane and is narrow in the vertical Z direction. Meanwhile, the reference axis TX of the exterior component 50 is an axis serving as a reference at the time of installing the exterior component 50. In the present embodiment, the reference axis TX is an axis perpendicular to a lid part 55 of the exterior component 50 described later, and is parallel to the rotation axis RX of the reflection mirror 31 and parallel to the Z axis.

The controller 40 controls operation of each of the laser light source of the light projector 10, the sensor of the light receiver 20, the rotation driver 32 of the rotating reflector 30, and the like. Additionally, the controller 40 obtains object information on the detection object OB from an electric signal converted from the reflection light L2 received by the sensor of the light receiver 20. Specifically, in a case where an output signal at the sensor is a predetermined threshold value or more, the controller 40 determines that the sensor has received the reflection light L2 from the detection object OB. In this case, a distance to the detection object OB is obtained from a difference between light emission timing at the laser light source and light reception timing at the sensor. Additionally, the object information such as a position, a size, a shape, and the like of the detection object OB can be obtained from the light received position and the like of the reflection light L2 at the sensor.

The exterior component 50 is provided to cover and protect the built-in components of the laser sensor 100. The exterior component 50 includes a lid-shaped main exterior part 51 and a cylindrical container-shaped sub-exterior part 52. The main exterior part 51 and the sub-exterior part 52 are detachably fixed with a fastener such as a bolt in a state where airtightness is kept inside the exterior component 50 by inserting a seal member or the like between edge parts 51a and 52a thereof.

Figure 2A:
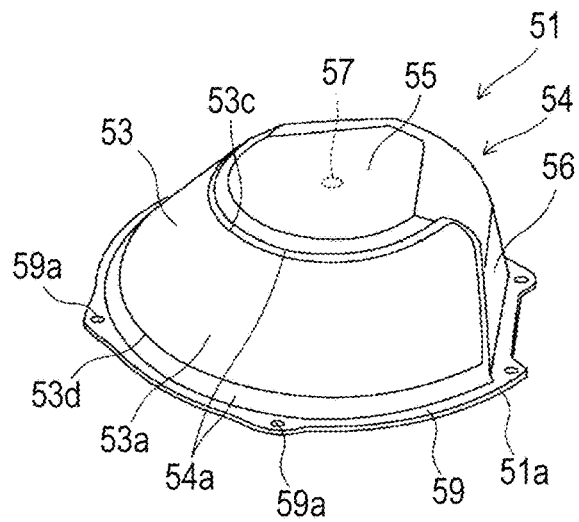
FIG. 2A to FIG. 2C illustrate a perspective view, a cross-sectional view, and a plan view respectively to describe a main exterior part of an exterior component of the laser sensor illustrated in FIG. 1.
Figure 2B:
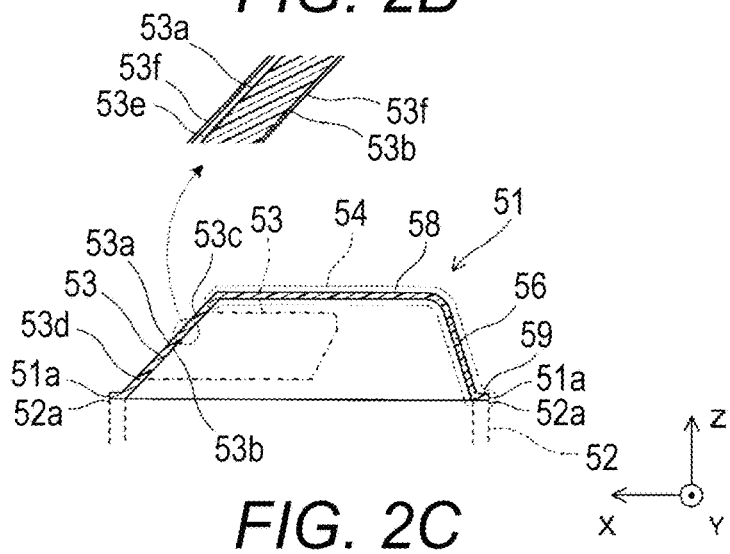
Figure 2C:
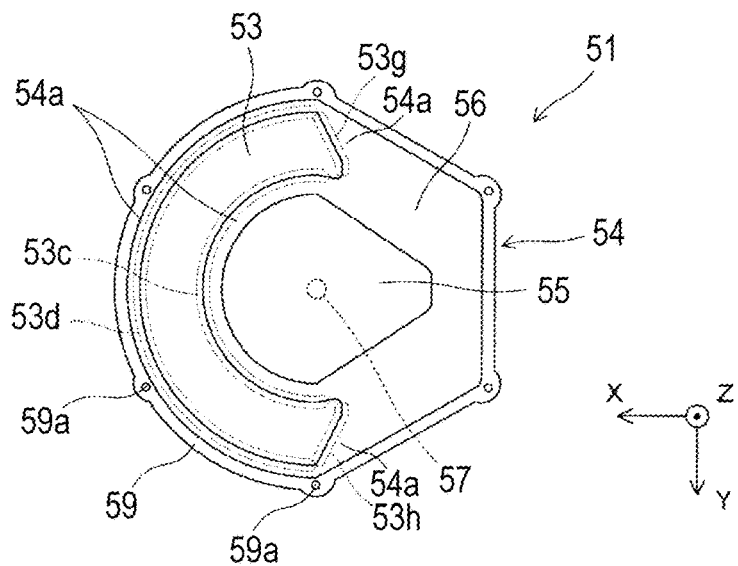

As illustrated in FIG. 2A to FIG. 2C, the main exterior part 51 is a member constituting a main portion of the exterior component 50 in a viewpoint of having an optical function to transmit a specific light beam or the like, and has a truncated conical outer shape. The main exterior part 51 includes the optical window 53 and a holder 54. The optical window 53 and the holder 54 are formed as an integrally-molded product made of a resin having transmittivity in a wavelength band of the laser light L1. The optical window 53 and the holder 54 have not only transmittivity for the laser light L1 but also is formed of a material that shields ambient light in a wavelength band other than the wavelength band of the laser light. Specifically, when the laser light L1 is infrared in a specific wavelength (for example, light in a wavelength of 900 nm), a resin material that transmits the wavelength (for example, 80% or more) is used for the optical window 53. On the other hand, when the laser light L1 is infrared (for example, light in a wavelength of 900 nm), it is preferable that the optical window 53 and the like be formed of a resin material that shields light in a wavelength band from 400 nm or more to 700 nm or less so as to avoid noise generation and component deterioration due to influence of ambient light in a visible range, such as sun light, a fluorescent lamp, and the like. As this kind of resin, it may be possible to use PMMA, PC, or the like in which transmittance in the visible light range is suppressed by an additive such as a dye or a pigment. Note that it is more preferable that the material for the optical window 53 and holder 54 be a material that relatively suppresses transmission of other infrared that has a wavelength different from that of the laser light L1 and may possibly become noise.

The optical window 53 in the exterior component 50 transmits the laser light L1 and the reflection light L2, has a uniform thickness, and is formed in a curved shape as a whole. The optical window 53 has a curved first optical surface 53a and a second optical surface 53b which are paired and face each other. The first optical surface 53a is a front surface of the exterior component 50, namely, an outer surface, and specifically, a conical surface. The second optical surface 53b is a surface on a rear side, namely, an inner surface of the exterior component 50, and specifically, a conical surface. Both of the optical surfaces 53a and 53b are arranged substantially symmetrically around the reference axis TX. The optical window 53 exists in a region covering the measurement range to be 60° or more with respect to the direction horizontal to the XY plane perpendicular to the reference axis TX of the exterior component 50 in a manner corresponding to the irradiation angle with the laser light. The optical window 53 includes a first side 53c and a second side 53d each having a predetermined curvature and facing each other along a contour. A radius of the curvature of the first side 53c on a +Z side differs from a radius of the curvature of the second side 53d on a −Z side. In the present embodiment, the radius of the curvature of the first side 53c adjacent to the lid part 55 of the holder 54 described later is smaller than the radius of the curvature of the second side in a manner corresponding to a fact that the optical surfaces 53a and 53a are conical surfaces. Each of the surfaces of the optical window 53 (i.e., the first and second optical surfaces 53a and 53b) has a gradient with respect to the reference axis TX. Since the optical window 53 has the gradient with respect to the reference axis TX, miniaturization of the exterior component 50 can be achieved while suppressing backward travel of the laser light L1 that is the projection light at the optical window 53. The optical window 53 includes a scratch-resistant hard coat layer 53e on the first optical surface 53a. With this structure, the optical window 53 exposed to the outside can be prevented from occurrence of scratches or the like that is to be a cause of deterioration of resolution. The hard coat layer 53e is formed by transfer, decoration, or coating using a film. Here, coating includes dipping, spraying, and the like. Additionally, the optical window 53 includes an antireflection layer 53f. The antireflection layer 53f is formed by any one of transfer, decoration, vapor deposition, sputtering, or coating using a film. Note that it is preferable that the antireflection layer 53f be provided outside the hard coat layer 53e. Since the antireflection layer 53f is provided at the optical window 53, not only degradation in transmission efficiency can be suppressed at the optical window 53 but also noise light from being generated by reflection of the laser light L1 can be prevented at the optical window 53. Additionally, it is preferable to provide the antireflection layer 53f in each of both of the first and second optical surface 53a and 53b as illustrated in the partly enlarged view of FIG. 2B because reflection occurs on both sides of the optical window 53. The hard coat is treated as, for example, a siloxane series organic film, but the hard coat may also be an acrylic or urethane series organic film, or a material to which an additive such as fluorine or $SiO_2$ is added. The antireflection layer 53f is formed by alternately layering a low refractive index layer made of $SiO_2$ and $Al_2O_3$ and a high refractive index layer made of $TiO_2$, but the materials are not limited to these substances, but it is also possible to adopt a single layer of a low refractive layer, a system that converts aluminum into boehmite, or a system that forms a moth-eye shape having fine irregularities.

The holder 54 surrounds an outer periphery of the optical window 53, and includes: a frame part 54a supporting an outer edge of the optical window 53, a lid part 55 extending from the +Z side of the frame part 54a and covering the reflection mirror 31 illustrated in FIG. 1 from the +Z side or an upper side; and a wall part 56 extending from a side part to a rear surface side of the frame part 54a and mainly covering the reflection mirror 31 from an −X side. In the present embodiment, the lid part 55 has a substantially circular shape or a fan-like shape and has an arcuate contour on the first side 53c side on an upper side of the optical window 53. In other words, the lid part 55 is provided in a manner indirectly extending from the first side 53c of the optical window 53 via the frame part 54a. The wall part 56 corresponds to the side surface of the truncated cone of the main exterior part 51 and has a boundary with the lid part 55 on the +Z side, and also has a boundary with the frame part 54a on each of third and fourth sides 53g and 53h sides adjacent to the first side 53c of the optical window 53. In other words, the wall part 56 is provided in a manner indirectly extending from the third and fourth sides 53g and 53h of the optical window 53 via the frame part 54a. The holder 54 includes a gate part 57 formed along with molding at a position relatively distant from the optical window 53. It is preferable that the gate part 57 be formed at a position symmetrical with respect to the optical window 53, that is, at a position on a center line extending in the X direction. Since the gate part 57 has a surface shape deformed by distortion of the gate part at the time of molding when the gate part is located close to the optical window 53, it is desirable that the gate part 57 be located at a position distant 10 times or more a gate size. For example, in a case where a gate diameter is Φ1.5 mm, it is preferable that the gate part be distant 15 mm or more. In the present embodiment, the gate part 57 is provided at the lid part 55 of the holder 54. More specifically, the gate part is provided substantially at a center of the lid part 55. The reason is that a resin from the gate part 57 uniformly reaches the optical window 53 at the time of molding and maintains optically important transferability and thickness accuracy in the horizontal direction. In the present embodiment, the gate part 57 and the lid part 55 may be flush without any level difference or the gate part 57 may project from the lid part 55. In either case, the position of the gate part 57 can be determined from a gate mark. The holder 54, namely, the frame part 54a, lid part 55, and wall part 56 have a light shielding part 58 that is located adjacent to and surrounding the first optical surface 53a and shields the laser light and ambient light. In the present embodiment, the light shielding part 58 is provided in a layered manner on an outer surface of the holder 54 out of the main exterior part 51 excluding the optical window 53. The light shielding part 58 is formed by, for example, applying a material that shields the laser light and ambient light or vapor-depositing the same. As an exemplary material of the light shielding part 58, a coating material or the like obtained by coloring a material of silicon series or urethane series with a pigment of an arbitrary color such as white or black and having a light shielding property. The edge part of the holder 54 (i.e., edge part 51a of the main exterior part 51) is provided with an annular connector 59 to be detachably connected to the sub-exterior part 52 that is a separate member. The connector 59 extends flat along the XY plane, and the connector 59 is provided, at a plurality of places, with hole parts 59a through each of which a fastener not illustrated is made to passes.

The sub-exterior part 52 is a mating component to which the main exterior part 51 is attached, and houses the light projector 10, light receiver 20, controller 40, and the like. The sub-exterior part 52 is formed of, for example, a resin having a light shielding property, and it is preferable that the resin have a linear expansion coefficient similar to that of the main exterior part 51. The sub-exterior part 52 may be formed of a resin similar to that of the main exterior part 51, but in this case, a member similar to the light shielding part 58 is provided by coating or the like in order to secure the light shielding property. Although not illustrated, the edge part 52a of the sub-exterior part 52 is also provided with a connector to be connected to the main exterior part 51, and a plurality of hole parts through each of which a fastener is made to pass is provided at positions corresponding to the hole parts 59a.

[Metal Mold for Molding Exterior Component 50]

Figure 3A:
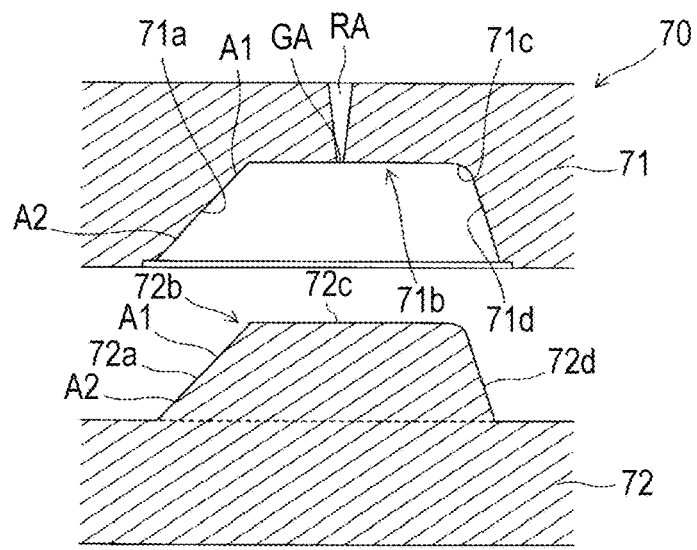
FIG. 3A to FIG. 3C are diagrams to describe a manufacturing method for the main exterior part for the exterior component.

Hereinafter, a metal mold for molding the main exterior part 51 of the exterior component 50 will be described. As illustrated in FIG. 3A, a metal mold 70 includes a first metal mold 71 and a second metal mold 72. In the present embodiment, the first metal mold 71 is a fixed mold and the second metal mold 72 is a movable mold. A transfer surface of the metal mold 70 is a reversed surface of a molding surface of the main exterior part 51 that is a molded product. The first metal mold 71 is mated with the second metal mold 72 on a mold mating face PL and forms a molded space 70a between the metal molds 71 and 72 (see FIG. 3C). A first window transfer 71a and a first holding transfer 71b are formed in the first metal mold 71 in a manner facing the molded space 70a in order to transfer a front side of the main exterior part 51, namely, a shape on the outer side thereof. The first window transfer 71a is provided to transfer a shape of the first optical surface 53a of the optical window 53, and includes a curved transfer surface and a mirror surface. The first holding transfer 71b is provided to transfer a shape on the front side of the holder 54, in which a first lid transfer 71c to transfer a shape of the lid part 55 and a first wall transfer 71d to transfer a shape of the wall part 56 are formed and a frame transfer to transfer a shape of the frame part 54a is also formed. The second metal mold 72 is provided with a second window transfer 72a and a second holding transfer 72b in order to transfer a shape on the rear side of the main exterior part 51, namely, the inner side thereof. The second window transfer 72a is provided to transfer a shape of the second optical surface 53b of the optical window 53 and includes a curved transfer surface and a mirror surface. The second holding transfer 72b is provided to transfer a shape on the rear side of the holder 54, in which a second lid transfer 72c to transfer the shape of the lid part 55 and a second wall transfer 72d to transfer the shape of the wall part 56 are formed and a frame transfer to transfer the shape of the frame part 54a is also formed. Each of the first and second window transfers 71a and 72a has a curvature and includes a first side A1 and a second side A2 facing each other along the contour. A radius of the curvature of the first side A1 differs from a radius of the curvature of the second side A2, and the surface or the transfer surface of each of the first and second window transfers 71a and 72a has a gradient with respect to the reference axis TX of the exterior component 50 (reference axis of the first and second holding transfers 71b and 72b). The first holding transfer 71b is provided with a gate GA communicating with the molded space 70a at a position relatively distant from the first window transfer 71a (e.g., 10 mm or more). With this structure, it is possible to avoid influence of distortion of the gate part 57 in the molded optical window 53. In the present embodiment, the gate GA is provided in the first lid transfer 71c indirectly extending from the first side A1 of the first holding transfer 71b via the frame transfer. Specifically, the gate GA is provided substantially at a center of the first lid transfer 71c in the first holding transfer 71b of the first metal mold 71. Thus, it is preferable that the gate GA be arranged at a position that is the same distance from the first window transfer 71a. With this structure, resin injection pressure is uniformly applied and it is possible to manufacture the main exterior part 51 having a uniform thickness in a longitudinal direction of the optical window 53. The gate GA is connected to a runner RA, a sprue (not illustrated), or the like provided to supply the resin, and the runner RA is filled with a molten resin J from the sprue, and the molded space 70a is filled with the same via the gate GA.

[Manufacturing Method for Exterior Component]

A manufacturing method for the main exterior part 51 by mainly using the metal mold 70 will be described below with reference to FIG. 3 to FIG. 5 and the like. In the present embodiment, an example in which a hard coat treatment step for the optical window 53 is performed in parallel with a molding step will be described.

A) Molding Step and Hard Coat Treatment Step

First, the metal molds 71 and 72 are heated to a temperature suitable for molding by a metal mold temperature controller (not illustrated).

Figure 3B:
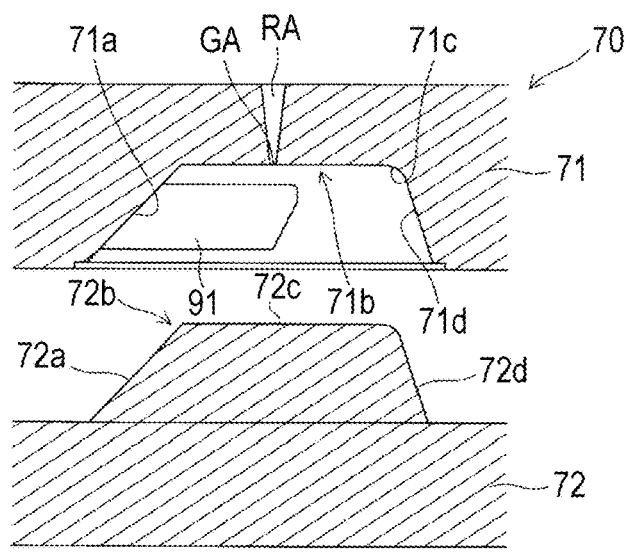
Figure 4A:
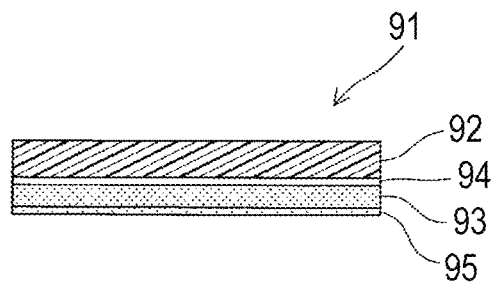
FIG. 4A to FIG. 4D are diagrams to describe hard coat treatment.
Figure 4B:
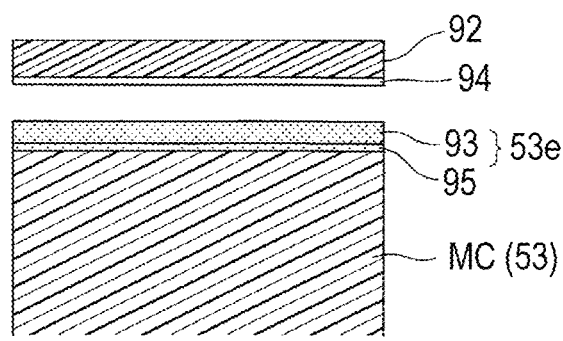
Figure 4C:
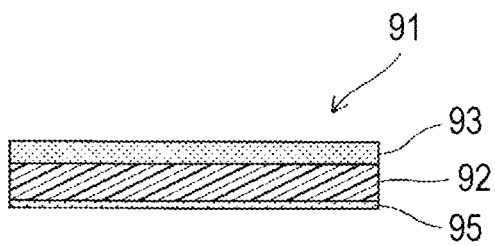
Figure 4D:
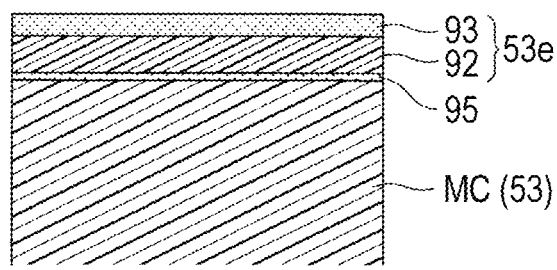

Next, preparation for hard coat treatment is performed. The hard coat treatment is performed by transfer, decoration, or the like using a film. As illustrated in FIG. 3B, a film 91 for hard coating is fixed by adsorption, pasting, or the like to a position corresponding to the first window transfer 71a of the first metal mold 71. As illustrated in FIG. 4A to FIG. 4D, for example, two types of the film 91 for hard coating are used in accordance with a molding method. Specifically, the hard coat layer 53e is formed by in-mold molding or insert molding. In a case of transferring only a hard coat film 93 by in-mold molding, a film 91 having a structure in which a mold releasing layer 94 is provided between a film base 92 and the hard coat film 93 and an adhesive layer 95 is interposed between the hard coat film 93 and a molded resin MC is used as illustrated in FIG. 4A. In this case, as illustrated in FIG. 4B, only the hard coat layer 53e remains on the molded resin MC side by peeling off the film base 92 after molding. Additionally, in a case of decorating the whole film 91 by insert molding, the film 91 having a structure in which the mold releasing layer 94 is not provided, the hard coat film 93 is integrated with the film base 92, and the adhesive layer 95 is interposed between the film base 92 and the molded resin MC is used as illustrated in FIG. 4C. In this case, as illustrated in FIG. 4D, the hard coat layer 53e is in a state integrated with the hard coat film 93 and the film base 92 after molding.

Figure 3C:
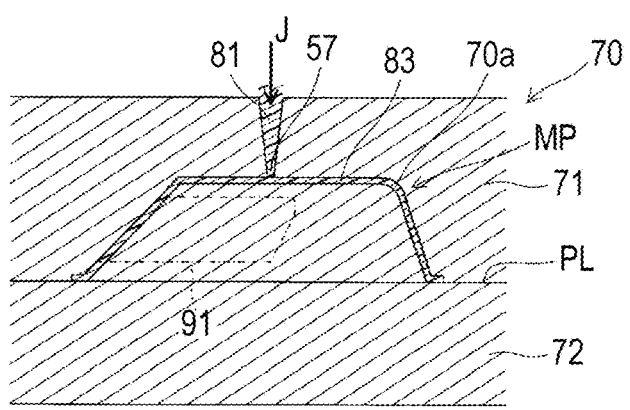

Next, as illustrated in FIG. 3C, the first metal mold 71 is mated with the second metal mold 72. After mold mating, mold clamping is performed to clamp the first metal mold 71 and the second metal mold 72 with a necessary pressure.

Next, as illustrated in FIG. 3C, injection is performed to inject the molten resin J into the molded space 70a with a necessary pressure by using an injection device (not illustrated). As a resin for molding, used is a resin having transmittivity in the wavelength band of the laser light and preferably having transmittivity that is suppressed in other wavelength bands. After the molded space 70a is filled with the resin, the metal mold 70 keeps a resin pressure inside the molded space 70a and gradually cools the molten resin J by heat radiation. In the above-described manner, a semi-molded product MP including a runner part 81 corresponding to the runner RA, the gate part 57 corresponding to the gate GA, and a product part 83 corresponding to the molded space 70a (original shape of the main exterior part 51 obtained later) are formed.

Figure 5A:
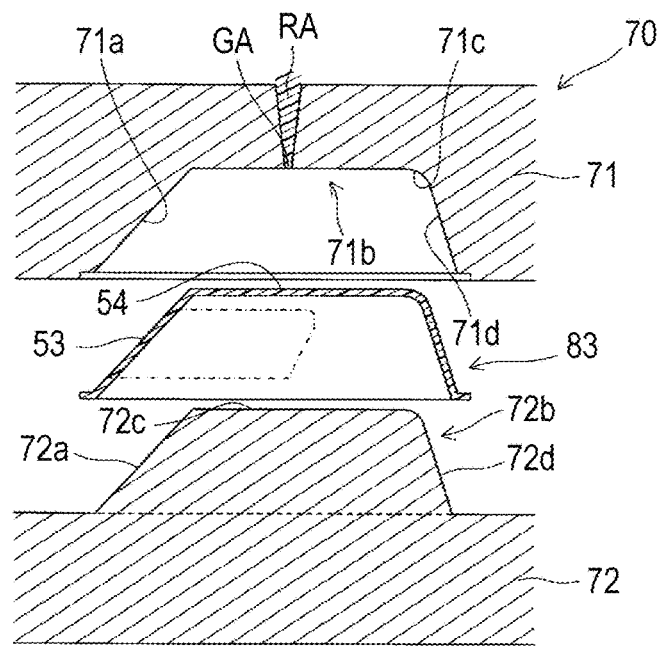
FIG. 5A to FIG. 5D are diagrams to describe a manufacturing method for the main exterior part for the exterior component.

Next, as illustrated in FIG. 5A, mold releasing to retract the second metal mold 72 that is the movable side is performed. At this point, a stripper plate (not illustrated) is first separated from the first metal mold 71 that is the fixed side, and as a result, the gate part 57 is cut from the semi-molded product MP. Next, the first metal mold 71 is separated from the second metal mold 72, and as a result, the product part 83 is released from the first metal mold 71 in a state being held by the second metal mold 72. After that, the product part 83 is ejected by an ejector pin (not illustrated) or the like. As a result, the product part 83 is pushed out to the first metal mold 71 side, and released from the second metal mold 72.

Next, an extractor (not illustrated) is actuated when mold releasing to retract the second metal mold 72 that is the movable side is performed, and the product part 83 is extracted from between the first and second metal molds 71 and 72 and conveyed to the outside. The product part 83 is a resin molded product in which the optical window 53 and the holder 54 are integrated. Additionally, in the product part 83, the hard coat layer 53e is also integrated on the first optical surface 53a of the optical window 53 in an adhering manner at the time of molding. With this structure, the hard coat layer 53e can be uniformly provided even when the optical window 53 has a complicated shape. Note that both of the optical window 53 and the holder 54 have light transmittivity in this stage, and therefore, it is necessary to apply light shielding treatment to the holder 54 in a later step.

B) Antireflection Treatment Step

Next, the antireflection layer 53f is formed on the optical window 53 of the product part 83. It is preferable that the antireflection layer 53f be formed on both surfaces of the first and second optical surfaces 53a and 53b. The antireflection layer 53f is uniformly formed on the entire surface of the optical window 53, but may also be formed in a manner extending to the holder 54 side. The antireflection treatment is performed by transfer, decoration, vapor deposition, sputtering, coating, or the like using a film. Specifically, the antireflection treatment may be an optical method of forming a plurality of film layers of materials having different refractive indexes, or a method of forming a moth-eye structure having fine irregularities. Additionally, the antireflection treatment may be applied by directly forming a film on a molded product by vapor deposition, coating, or the like, or may be composite treatment using an antireflection functional film. As a method using a film, a three-dimensional laminate in which a film is decorated on a molded product may be adopted, the antireflection layer 53*f* may be formed by hot stamp or the like using a transfer film or may be formed by pasting a film coated with a pressure sensitive adhesive/adhesive to a molded product. Additionally, the antireflection layer may be made to adhere at the time of molding as described above although details thereof will be described later. In that case, the film on the first optical surface 53*a* side may be prepared to have a structure including the antireflection layer 53*f* on the above-described hard coat layer 53*e* (see FIG. 10A and FIG. 10B).

C) Light Shielding Treatment Step

Figure 5B:
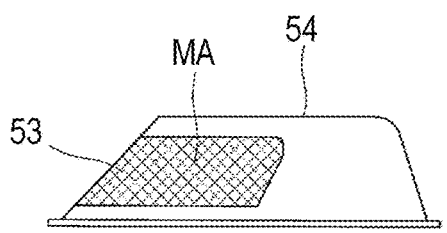
Figure 5C:
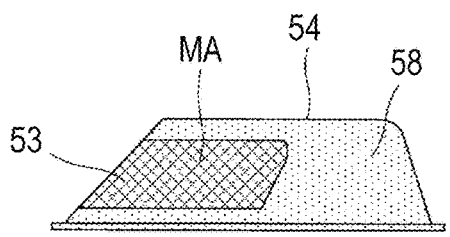
Figure 5D:
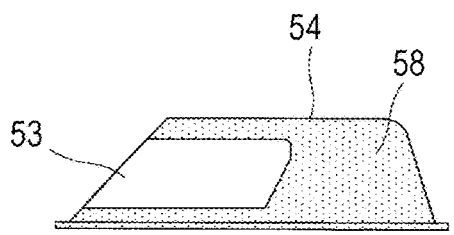

Next, the light shielding part 58 is formed on the holder 54 of the product part 83. Specifically, after a mask MA is set on the first optical surface 53*a* of the optical window 53 as illustrated in FIG. 5B, the outer surface of the holder 54 is coated with a material that shields laser light and ambient light as illustrated in FIG. 5C. As the mask MA, for example, a polyethylene masking film is used. A masking film of polypropylene, polyester, or the like may also be used in accordance with a purpose of use. In the present embodiment, the light shielding part 58 is formed on the entire holder 54 out of the main exterior part 51. After the light shielding treatment step, the main exterior part 51 is obtained by removing the mask MA from the optical window 53 as illustrated in FIG. 5D. After that, the edge part 51*a* of the main exterior part 51 and the edge part 52*a* of the sub-exterior part 52 are positioned in a state in which the built-in components are incorporated and fixed inside the sub-exterior part 52 manufactured in a separate step, and are fixed with fasteners such as bolts via a sealing member formed of a material such as fluororubber for dustproof and waterproof. Consequently, the laser sensor 100 is completed.

According to the laser sensor and the like described above, since the optical window 53 is not needed to be joined to the holder 54 in a separate step because the optical window 53 and the holder 54 of the exterior component 50 are formed as the integrally-molded product made of the resin, there is no joining layer or the like between the optical window 53 and the holder 54. Therefore, there is no influence on the surface shape of the optical window 53, the dustproof and waterproof properties are excellent, and maintenance is also easy. It is necessary to join the main exterior part 51 to the sub-exterior part 52 that is a mating component, but there is no influence on the optical surfaces 53*a* and 53*b* of the optical window 53 in this joining, and detachable assembly with bolts or the like is enabled by using a sealing member. Additionally, since the optical window 53 and the holder 54 are integrated, the exterior component 50 of the laser sensor 100 has relatively high rigidity, shape variation due to shrinkage and deformation at the time of molding is reduced, and the optical window 53 with high accuracy is achieved. Furthermore, since the optical window 53 and the holder 54 are integrated, structural or shape-related restrictions are more reduced than in a case of joining the optical window 53 in a separate step, and weight reduction and miniaturization of the laser sensor 100 can be achieved.

The optical window 53 of the exterior component 50 is required to have high shape accuracy in order to project and receive light at and from a targeted place. In a method of manufacturing an optical window in which an original pattern of the optical window is cut out from a flat plate and bending processing is applied thereto like a conventional technique, a shape error occurs depending on a contacting state of a jig, and therefore, machining accuracy is hardly obtained, shapes are varied, and R shape processing with high accuracy is difficult. This is apparent particularly in a case where radii of curvatures of an upper side (corresponding to the first side 53*c* of the present embodiment) and a lower side (corresponding to the second side 53*d* of the present embodiment) of an optical window are different and an optical surface has a gradient with respect to the reference axis of the exterior component. Meanwhile, in a case of having a cylindrical shape in which an upper side and a lower side of the optical window have the same radii of curvatures, machining is easier than in a case where the radii of the curvatures are different, but there are problems that an internal reflection is increased and the reflection light is changed into noise. Additionally, in a method of manufacturing an optical window by injection molding, when a gate part is located close to the optical window, an optical surface may be distorted and a product thickness may be varied between the gate side and an opposite side of the gate side due to the gate position, and it may be difficult to control the thickness with high accuracy. Furthermore, in a case where an optical window has a U-shape, rigidity is low, and therefore, the shape is varied due to shrinkage, mold releasing, and the like after molding, and an error may occur in an R shape. Moreover, since rigidity of the manufactured optical window is low in both of the cases of bending processing and injection molding, it is difficult to hold a product without deformation for evaluation of components, and also quality control is difficult because deformation may occur when measurement is performed by a contact type instrument.

Additionally, since the exterior components 50 are used outdoor for monitoring use, weather resistance against sunlight, rain, and the like, and dustproof and waterproof properties are required. In the case of joining the exterior component to a component to which an optical window is to be attached by using an adhesive like a conventional technique, there is a problem that a surface shape of the optical window is distorted by stress thereof. Additionally, in a case where there is an error between a shape of the optical window and a shape of a mating component at the timing joining the optical window to the component to which the optical window is to be attached, there may be a portion not matched. Furthermore, a defect in which the optical surface is deformed by distortion caused by an adhesive or the like is generated. Additionally, in the case of joining with an adhesive or the like, peeling is caused by deterioration of the adhesive or the like, and it is difficult to keep the dustproof and waterproof properties. Particularly, in the case where the optical window is made of a resin and a component to which the optical window is attached is a metal, there is a difference in a linear expansion coefficient between these components, and therefore, a joined part is easily peeled off.

As described above, even when the optical window 53 has a complex shape, the dustproof and waterproof properties are secured and the optical window 53 with high accuracy can be achieved by forming the optical window 53 and the holder 54 as an integral molded product made of the resin like the laser sensor 100 of the present embodiment.

Second Embodiment

A manufacturing method and the like for an exterior component according to a second embodiment will be described below. The manufacturing method and the like for an exterior component according to the second embodiment is a method obtained by partly modifying a manufacturing method for an exterior component according to a first embodiment, and matters not specifically described are similar to those in the first embodiment.

Figure 6:
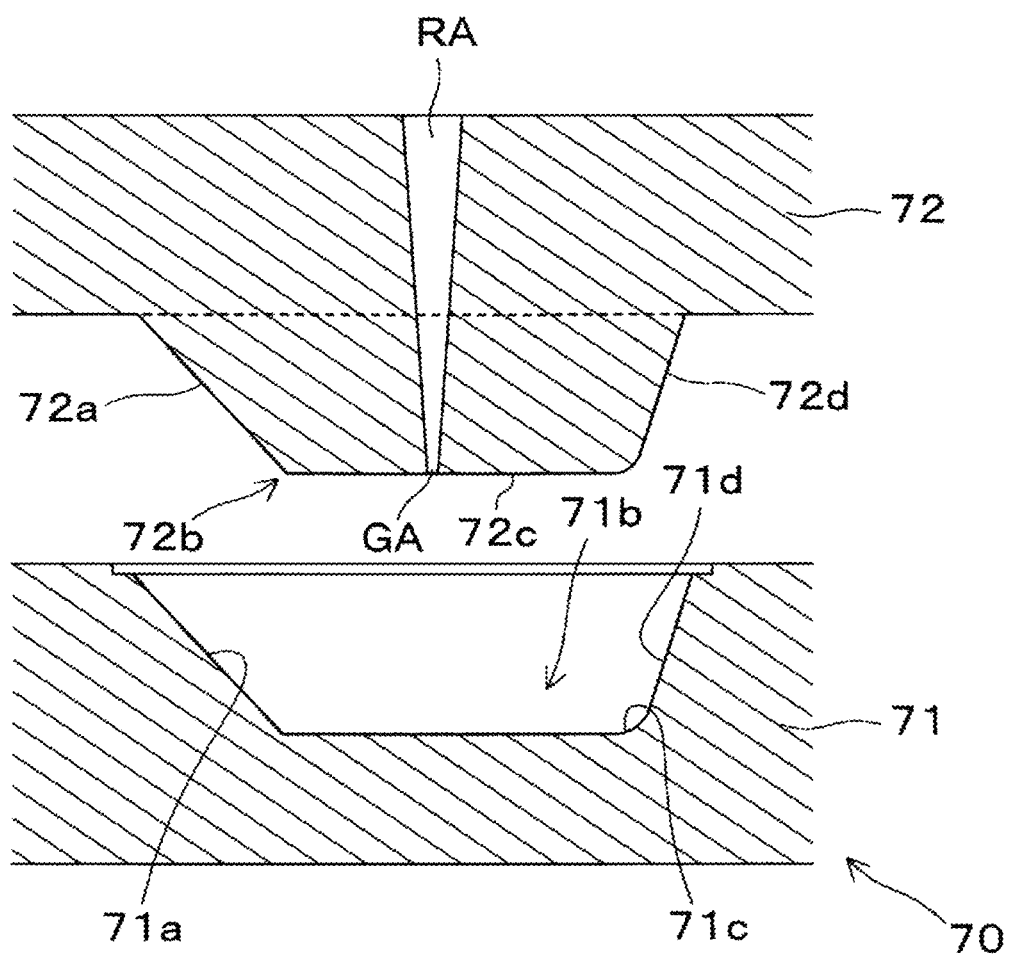
FIG. 6 is a diagram to describe a metal mold for manufacturing a main exterior part of an exterior component according to a second embodiment.

As illustrated in FIG. 6, a first metal mold 71 is a movable metal mold and a second metal mold 72 is a fixed metal mold in a metal mold 70 used to manufacture an exterior component 50 of the present embodiment. In other words, a structure of the metal mold 70 described in the first embodiment is reversed, and a gate GA is provided on the second metal mold 72 side. Therefore, in a main exterior part 51 to be molded, the gate part 57 is formed substantially at a center of a rear side surface of a lid part 55 of a holder 54.

Third Embodiment

A manufacturing method and the like for an exterior component according to a third embodiment will be described below. The manufacturing method and the like for an exterior component according to the third embodiment is a method obtained by partly modifying a manufacturing method for an exterior component according to a first embodiment, and matters not specifically described are similar to those of the first embodiment.

The manufacturing method for an exterior component according to the present embodiment will be described below. In the first embodiment, a molding step and a hard coat treatment step are performed in parallel, but in the present embodiment, the hard coat treatment step is performed after the molding step.

A) Molding Step

Figure 7A:
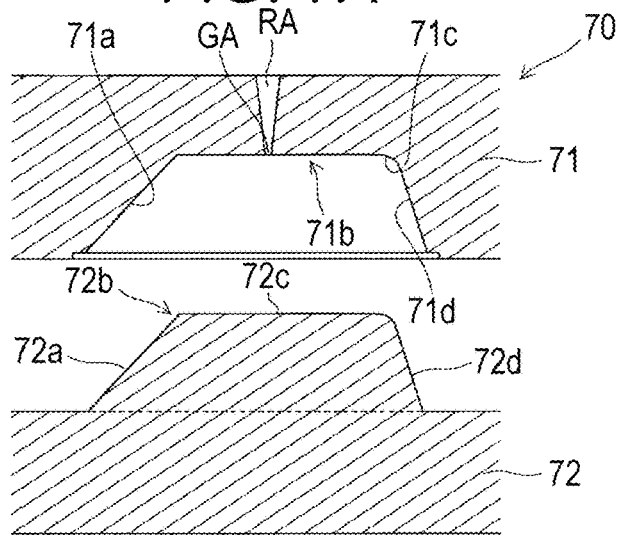
FIG. 7A to FIG. 7C are diagrams to describe a manufacturing method for a main exterior part of an exterior component according to a third embodiment.
Figure 7B:
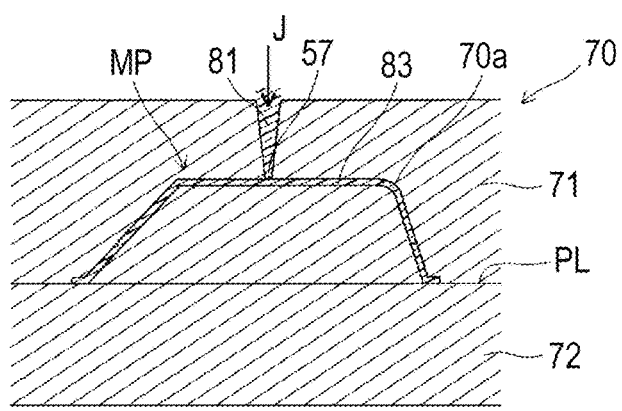
Figure 7C:
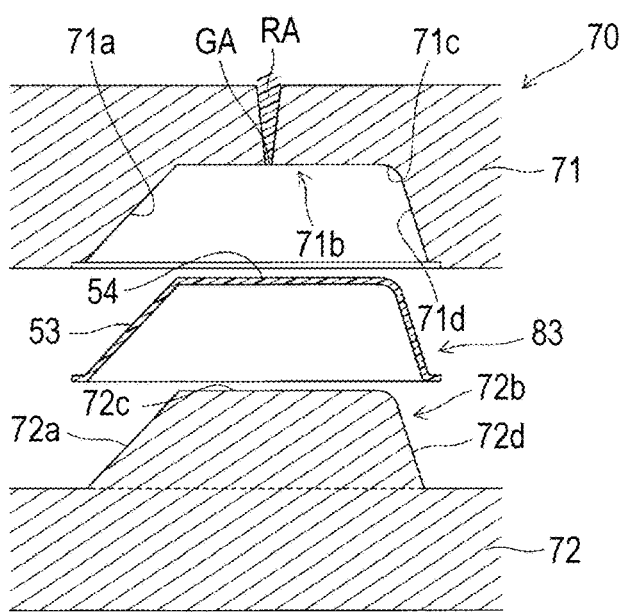

First, as illustrated in FIG. 7A, a metal mold 70 similar to that of the first embodiment is prepared, and the first and second metal molds 71 and 72 are clamped and a molten resin J is injected into a molded space 70a as illustrated in FIG. 7B. After that, as illustrated in FIG. 7C, the first and second metal molds 71 and 72 are separated, and a product part 83 is extracted.

B) Hard Coat Treatment Step

Figure 8A:
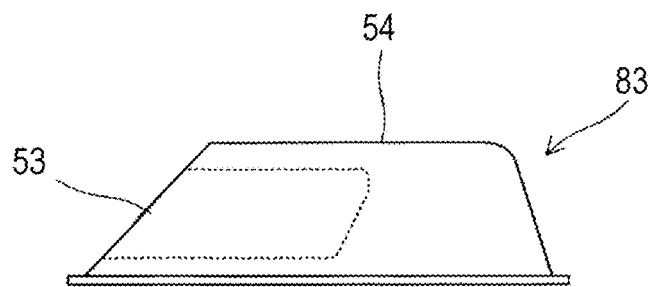
FIG. 8A to FIG. 8D are diagrams to describe a manufacturing method for the main exterior part of the exterior component according to the third embodiment.

Next, a hard coat layer 53e is formed on an optical window 53 of the product part 83 illustrated in FIG. 8A. The hard coat layer 53e is uniformly formed on an entire surface of a first optical surface 53a, but may be formed in a manner extending to a holder 54 side or may be formed in an entire region including a second optical surface 53b on an inner side. The hard coat treatment is performed by transfer or decoration using a hard coating film, coating with hard coat solution, or the like. In the case of performing transfer or decoration using a film, a film 91 for hard coating used in the first embodiment can be used (see FIG. 4A to FIG. 4D). As a method using a film, a three-dimensional laminate in which a film is decorated on a molded product may be adopted, the hard coat layer 53e may be formed by hot stamp or the like using a transfer film or may be formed by pasting, to a molded product, a film coated with a pressure sensitive adhesive/adhesive. A coating method may be selected from among a dip method, a spray method, a spin method, and the like in accordance with a shape.

C) Antireflection Treatment Step

Next, an antireflection layer 53f is formed on the optical window 53 of the product part 83. It is preferable that the antireflection layer 53f be formed on both surfaces of the first and second optical surfaces 53a and 53b. The antireflection layer 53f is uniformly formed on the entire surface of the optical window 53, but may also be formed in a manner extending to the holder 54 side. The antireflection treatment is performed by transfer, decoration, vapor deposition, sputtering, coating, or the like using a film.

D) Light Shielding Treatment Step

Figure 8B:
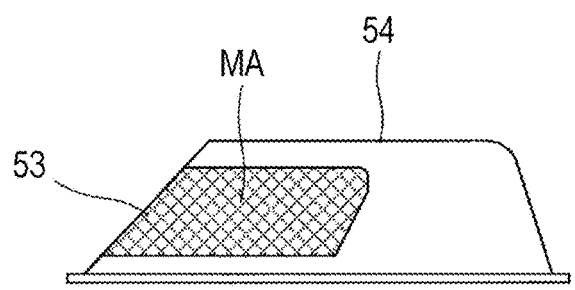
Figure 8C:
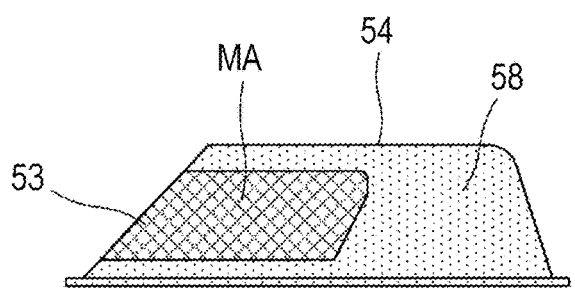
Figure 8D:
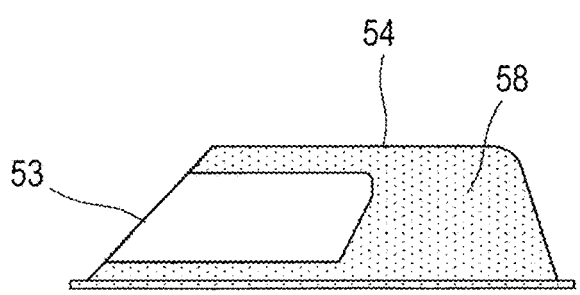

Next, a light shielding part 58 is formed on the holder 54 of the product part 83. Specifically, after a mask MA is set on the first optical surface 53a of the optical window 53 as illustrated in FIG. 8B, the outer surface of the holder 54 is coated with a material that shield laser light and ambient light as illustrated in FIG. 8C. Consequently, the light shielding part 58 is formed on the entire holder 54 out of a main exterior part 51. After the light shielding treatment step, the main exterior part 51 is obtained by removing the mask MA from the optical window 53 as illustrated in FIG. 8D.

Fourth Embodiment

A laser sensor and the like according to a fourth embodiment will be described below. Note that the laser sensor and the like according to the fourth embodiment is obtained by partly modifying a laser sensor and the like of a first embodiment, and matters not specifically described are similar to those of the first embodiment.

Figure 9:
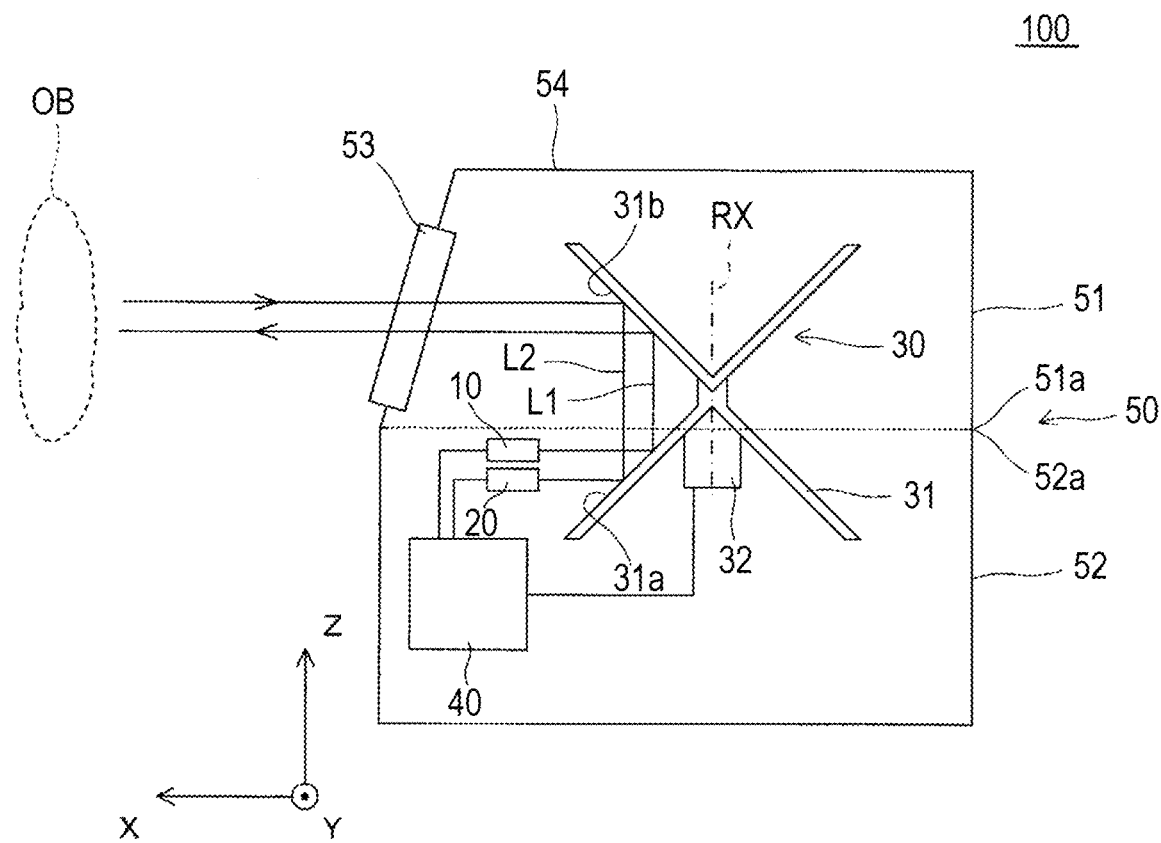
FIG. 9 is a schematic view to describe a structure of a laser sensor according to a fourth embodiment of the present invention.

In the present embodiment, a laser sensor 100 includes a light projector 10, a light receiver 20, a rotating reflector 30, a controller 40, and an exterior component 50 as illustrated in FIG. 9 in a manner similar to the first embodiment. Here, a reflection mirror 31 of the rotating reflector 30 of the present embodiment is a twice-reflection type polygon mirror and has a first reflector 31a and a second reflector 31b to bend an optical path. The first and second reflectors 31a and 31b are arranged vertically along a rotation axis RX extending parallel to a Z direction. The first and second reflectors 31a and 31b each has a pyramidal shape and are substantially symmetrical with respect to a boundary portion therebetween. In the reflection mirror 31, a mirror surface of the first reflector 31a is inclined with respect to the Z axis and reflects laser light L1 incident from a +X direction, namely, a left direction in the drawing toward a substantially orthogonal direction thereto, and guides the same to a mirror surface of the second reflector 31b in a vertical direction in the drawing. The mirror surface of the second reflector 31b is inclined with respect to the Z axis and reflects the laser light L1 incident from the −Z direction, namely, a lower direction in the drawing toward the substantially orthogonal direction thereto, and guides the same to a detection object OB side, namely, the left direction in the drawing. A part of reflection light L2 reflected at the detection object OB travels along a path opposite to a path of the laser light L1 and is detected by the light receiver 20. In other words, the reflection mirror 31 reflects again the reflection light L2 that has been reflected at the detection object OB, namely, the returned light at the mirror surface of the second reflector 31b, and guides the same to the mirror surface of the first reflector 31a. Subsequently, the reflection light L2 is reflected again at the mirror surface of the first reflector 31a, and guided to the light receiver 20 side. When the reflection mirror 31 is rotated, a travel direction of the laser light L1 is changed inside the plane (i.e., XY surface) orthogonal to the Z axis direction. In other words, with rotation of the reflection mirror 31, scanning with the laser light L1 is performed along a Y direction. An angular region scanned with the laser light L1 is to be a detection region. Since the rotating reflector 30 of the present embodiment is the twice-reflection type, the detection region in the Z axis direction is wider than a one-time reflection type.

Figure 10A:
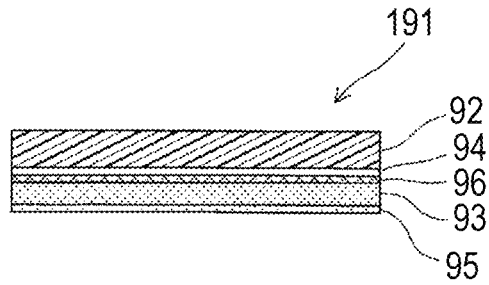
FIG. 10A and FIG. 10B are diagrams to describe a modified example of hard coat treatment and antireflection treatment.
Figure 10B:
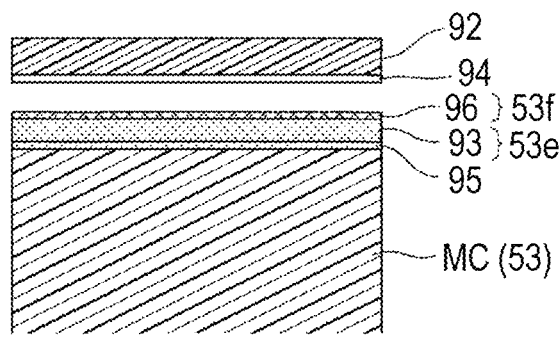

While the present invention has been described with reference to the embodiments and examples, the present invention is not limited to the above-described embodiments and the like. For example, in the first embodiment, the hard coat treatment step is performed in parallel with the molding step, but the hard coat treatment step and the antireflection treatment step may be performed in parallel with the molding step. In this case, for example, a film 191 as illustrated in FIG. 10A and FIG. 10B is used. Specifically, in a case of in-mold molding, used is the film 191 having a structure in which an antireflection film 96 is provided on a hard coat film 93 and a mold releasing layer 94 and a film base 92 are provided thereon as illustrated in FIG. 10A. With this structure, as illustrated in FIG. 10B, the hard coat layer 53e and the antireflection layer 53f are formed in a molded resin MC when the film base material 92 is peeled off after molding. The antireflection treatment using such a film can also be applied to the second optical surface 53b of the optical window 53, and in this case, a film obtained by removing the hard coat film 93 from the film 191 illustrated in FIG. 10A and FIG. 10B may be used. Additionally, although not illustrated, in a case of insert molding, a film obtained by adding an antireflection film onto the hard coat film 93 is used in the film 91 illustrated in FIG. 4C and FIG. 4D.

Additionally, in the third embodiment, the light shielding treatment step, the hard coat treatment step and the antireflection treatment step may be performed in reverse. In other words, in the light shielding process step, coating is performed with the mask MA set on the optical window 53, and the mask MA is removed, and then the hard coat treatment step and the antireflection treatment step are performed.

Furthermore, in the above-described embodiments, the built-in components of the laser sensor 100 and arrangement thereof can be suitably changed. For example, in the laser sensor 100, a folding mirror to bend an optical path of each of the laser light L1 and the reflection light L2 may be provided between the rotating reflector 30 and the optical window 53. Additionally, an optical filter or the like may be provided in front of the sensor in the light receiver 20. Furthermore, a light shielding member may be provided around the light receiver 20 in order to avoid stray light.

Additionally, in the above-described embodiments, provided is the structure in which the main exterior part 51 is located on the upper side and the sub-exterior part 52 is located on the lower side, but it is also possible to provide a structure in which the main exterior part 51 is located on the lower side and the sub-exterior part 52 is located on the upper side. In this case, provided is the structure in which the lid part 55 of the main exterior part 51 extends from the lower side of the exterior component 50, that is, from the second side 53d of the optical window 53. Furthermore, the structures or the shapes of the main exterior part 51 and the sub-exterior part 52 can be suitably changed. For example, the main exterior part 51 may have, within a range not influencing the rigidity of the main exterior part 51, a structure only including the optical window 53 and the lid part 55, a structure only including the optical window 53 and the wall part 56, or a structure including the optical window 53 and the frame part 54a. Also, the holder 54 may have a shape in which a part of the truncated cone shape is cut off. Additionally, it may also be possible to adopt a structure in which the laser sensor 100 is directly attached to an attachment portion as a separate member without using the sub-exterior part 52.

Figure 11:
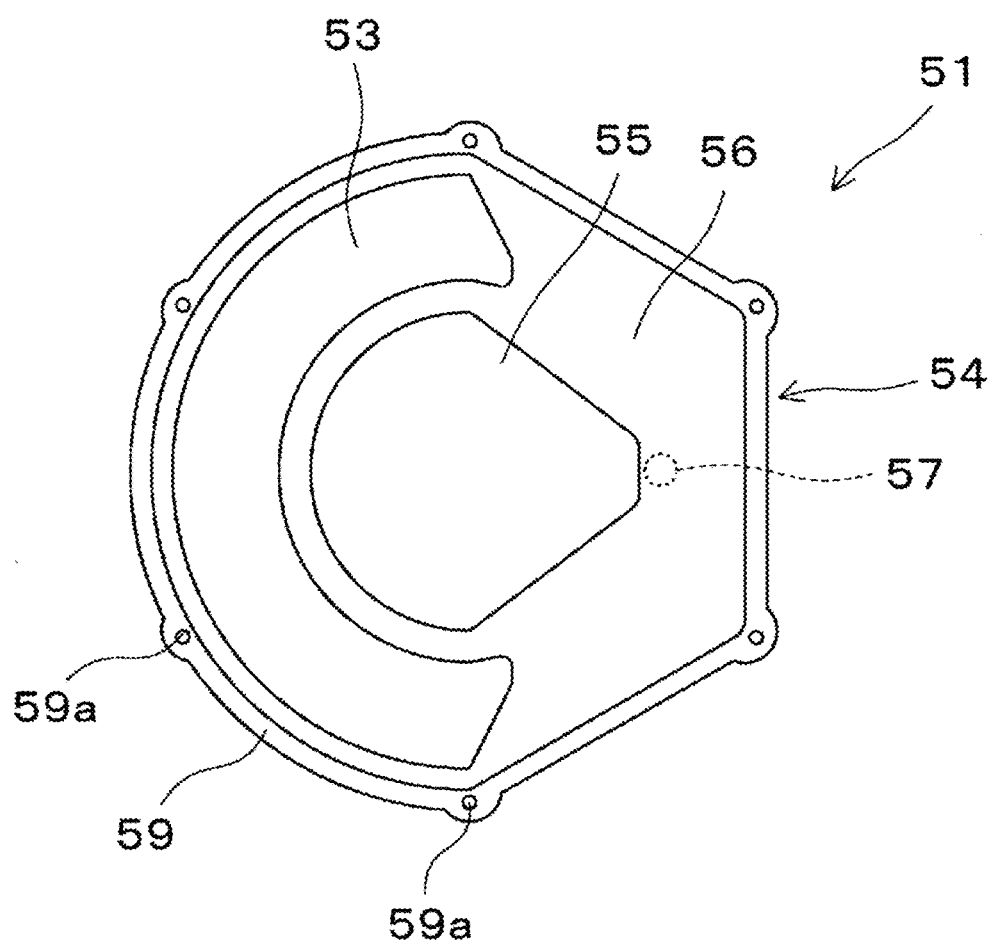

Additionally, in the above-described embodiments, the position of the gate part 57 is provided at substantially the center of the lid part 55 of the holder 54, but may also be provided at other positions as far as surface accuracy of the optical window 53 can be maintained. For example, the gate part 57 may also be provided at a position more distant from the optical window 53 of the lid part 55 or at a position facing the optical window 53 of the wall part 56 as illustrated in FIG. 11.

Figure 12:
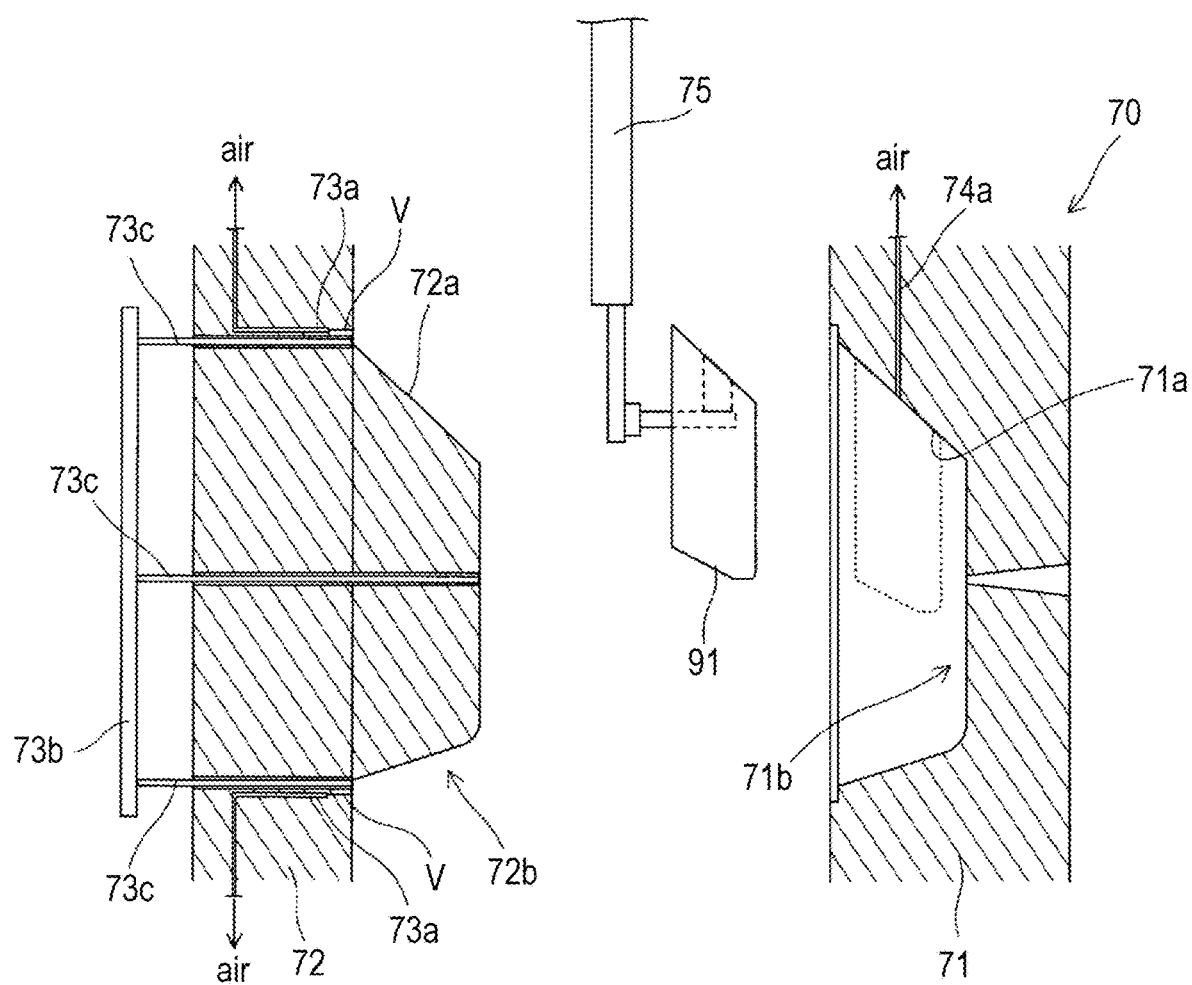
FIG. 12 is a diagram to describe a modified example of the main exterior part illustrated in FIG. 3B.

Additionally, the structure of the metal mold 70 in the above-described embodiments can be a structure illustrated in FIG. 12. Specifically, air inside the metal mold 70 and a gas from the molten resin J can be removed and the molten resin J can be easily introduced into the molded space 70a by providing, at the second metal mold 72 that is the movable side, a suction pipe 73a connected to an air vent (air releasing groove) V contacting a product shape. Furthermore, an ejector 73b to easily eject the product part 83 can be provided at the second metal mold 72 that is the movable side. The ejector 73b is provided with a plurality of ejector pins 73c at positions corresponding to a peripheral part of the gate part 57 of the lid part 55 or at positions corresponding to the connectors 59 of the product part 83 (namely, main exterior part 51). Additionally, in the first embodiment, the antireflection film 91 is fixed to the first metal mold 71 by adsorbing, pasting, or the like, and specifically, an adsorption pipe 74a is provided at the first metal mold 71 that is the fixed side, for example, so as to adsorb the film 91. Furthermore, the film 91 may be guided to the first window transfer 71a by using an arm 75 or the like.

Moreover, in the above-described embodiments, the lenses are provided in the light projector 10 and the light receiver 20, but the structures of the light projector 10 and light receiver 20 can be suitably changed.

The invention claimed is:

1. A laser sensor including a light projector, a light receiver to detect reflection light from a detection object to which laser light is emitted from the light projector, and an exterior component covering the light projector and the light receiver, wherein the exterior component includes an optical window through which the laser light and the reflection light are transmitted, and a holder that surrounds an outer periphery of the optical window, the optical window and the holder are formed as an integrally-molded product made of a resin having transmittivity in a wavelength band of the laser light, the optical window includes a pair of curved optical surfaces facing each other, and the holder includes: a gate part at a position relatively distant from the optical window;

and a light shielding part that is located at least adjacent to the optical surfaces and shields the laser light and ambient light, wherein:

the optical window includes a first side and a second side which have curvatures and face each other along a contour, a radius of the curvature of the first side is different from a radius of the curvature of the second side, a surface of the optical window has a gradient with respect to the reference axis of the exterior component, and a lid part extending from one of the first and second sides of the holder has the gate part.

2. The laser sensor according to claim 1, wherein the holder extends from an outer edge of the optical window and includes at least one of the lid part and a wall part to cover a built-in component.

3. The laser sensor according to claim 2, wherein the optical window has a region that covers a measurement range where an irradiation angle with the laser light is 60° or more with respect to a direction perpendicular to a reference axis of the exterior component.

4. The laser sensor according to claim 1, wherein the optical window has a region that covers a measurement range where an irradiation angle with the laser light is 60° or more with respect to a direction perpendicular to a reference axis of the exterior component.

5. The laser sensor according to claim 1, wherein the optical window and the holder are made of a resin that shields light in a wavelength band in a range of 400 nm to 700 nm.

6. The laser sensor according to claim 1, wherein the holder has a connector connected to a separate member and is detachable from the separate member.

7. The laser sensor according to claim 1, wherein the optical window includes a hard coat layer.

8. The laser sensor according to claim 7, wherein the hard coat layer is formed by transfer, decoration, or coating using a film.

9. The laser sensor according to claim 1, wherein the optical window includes an antireflection layer.

10. The laser sensor according to claim 9, wherein the antireflection layer is formed by any one of transfer, decoration, vapor deposition, sputtering, and coating using a film.

11. A manufacturing method for an exterior component for a laser sensor, comprising:
a molding of integrally molding the exterior component from a resin having transmittivity in a wavelength band of laser light by using a metal mold that includes a window transfer to form an optical window and a holding transfer to form a holder surrounding an outer periphery of the optical window out of an exterior component, the optical window transmitting at least laser light and reflection light of the laser sensor; and
a light shielding treatment of forming, in the holder, a light shielding part that shields the laser light and ambient light, wherein
the window transfer includes a curved transfer surface, and
the holding transfer includes a gate at a position relatively distant from the window transfer,
wherein the holding transfer includes at least one of a lid transfer and a wall transfer to form at least one of a lid part and a wall part extending from an outer edge of the optical window.

12. The manufacturing method for an exterior component according to claim 11, wherein
the window transfer includes a first side and a second side which have curvatures and face each other along a contour,
a radius of the curvature of the first side is different from a radius of the curvature of the second side, and
a surface of the window transfer has a gradient with respect to a reference axis of the exterior component.

13. The manufacturing method for an exterior component according to claim 12, wherein the lid transfer extending from one of the first and second sides out of the holding transfer has the gate.

14. The manufacturing method for an exterior component according to claim 11, further comprising a hard coat treatment of applying hard coat treatment to the optical window.

15. The manufacturing method for an exterior component according to claim 14, wherein the hard coat treatment is performed by transfer, decoration, or coating using a film.

16. The manufacturing method for an exterior component according to claim 11, further comprising an antireflection treatment of applying antireflection treatment to the optical window.

17. The manufacturing method for an exterior component according to claim 16, wherein the antireflection treatment is performed by any one of transfer, decoration, vapor deposition, sputtering, and coating using a film.

* * * * *